(12) United States Patent
Henning et al.

(10) Patent No.: US 10,221,908 B2
(45) Date of Patent: *Mar. 5, 2019

(54) DISC BRAKE WITH ADJUSTMENT MECHANISM HAVING A THREAD DEVICE

(71) Applicant: WABCO Europe BVBA, Brussels (BE)

(72) Inventors: Paul Henning, Schwetzingen (DE); Hans-Christian Jungmann, Gorxheimertal (DE); Marcus Keller, Weinheim (DE); Piotr Macutkiewicz, Swidnica (PL); Bernward Redemann, Hockenheim (DE); Gunther Stingl, Muehltal (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/516,896

(22) PCT Filed: Nov. 6, 2015

(86) PCT No.: PCT/EP2015/002233
§ 371 (c)(1),
(2) Date: Apr. 5, 2017

(87) PCT Pub. No.: WO2016/082912
PCT Pub. Date: Jun. 2, 2016

(65) Prior Publication Data
US 2017/0292576 A1 Oct. 12, 2017

(30) Foreign Application Priority Data

Nov. 25, 2014 (DE) .......................... 10 2014 017 430

(51) Int. Cl.
*F16D 65/56* (2006.01)
*F16D 55/2255* (2006.01)

(52) U.S. Cl.
CPC ....... *F16D 65/567* (2013.01); *F16D 55/2255* (2013.01)

(58) Field of Classification Search
CPC .......... F16D 65/18; F16D 65/52; F16D 65/56; F16D 65/367; F16D 65/567
(Continued)

(56) References Cited

U.S. PATENT DOCUMENTS 3,520,385 A * 7/1970 Beckman ................ F16D 65/18
188/196 F
3,590,964 A * 7/1971 Krause .................... F16D 65/18
188/106 F
(Continued)

FOREIGN PATENT DOCUMENTS

CN 101163904 A 4/2008
DE 3407018 A1 8/1985
(Continued)

*Primary Examiner* — Christopher P Schwartz
(74) *Attorney, Agent, or Firm* — Leydig, Voit & Mayer, Ltd.

(57) ABSTRACT

A disk brake includes a brake disk, a brake caliper, at least one application device lying within the brake caliper on one side of the brake disk, an axially movable device configured to move a brake pad axially toward the brake disk, and an adjustment mechanism configured to be rotated about an rotation axis lying parallel to a rotation axis of the brake disk and which, in the case of rotation in a first direction of rotation bringing about adjustment, is configured to rotate the actuating spindle. The adjustment mechanism includes a thread device which, at least in a rotation in a second direction of rotation opposite the first direction of rotation, is configured to mesh with the external thread of the actuating spindle and to screw the adjustment mechanism in relation to the actuating spindle.

15 Claims, 5 Drawing Sheets

(58) Field of Classification Search
USPC ..... 188/71.7–71.9, 72.6–72.9, 196 F, 196 B, 188/196 BA, 196 V, 196 D
See application file for complete search history.

(56) References Cited

U.S. PATENT DOCUMENTS

| | | | |
|---|---|---|---|
| 4,056,173 A * | 11/1977 | Farr | F16D 65/567 |
| | | | 188/196 D |
| 4,354,581 A * | 10/1982 | Birkenbach | F16D 55/224 |
| | | | 188/196 BA |
| 4,934,990 A | 6/1990 | Backers | |
| 5,353,896 A | 10/1994 | Baumgartner et al. | |
| 5,788,022 A * | 8/1998 | Antony | F16D 65/18 |
| | | | 188/196 D |
| 6,213,255 B1 | 4/2001 | Neuwirth | |
| 6,311,809 B1 * | 11/2001 | Thomas | F16D 55/227 |
| | | | 188/72.7 |
| 7,152,722 B1 | 12/2006 | Banks et al. | |
| 7,389,858 B2 | 6/2008 | Sandberg et al. | |
| 8,875,851 B2 * | 11/2014 | Winkler | F16D 65/18 |
| | | | 188/106 F |
| 2002/0148313 A1 * | 10/2002 | Schalz | B23Q 5/40 |
| | | | 74/424.5 |
| 2008/0265486 A1 | 10/2008 | Schalk et al. | |
| 2009/0283371 A1 * | 11/2009 | Winkler | F16D 65/18 |
| | | | 188/72.6 |
| 2010/0294601 A1 | 11/2010 | Kraus et al. | |
| 2011/0147138 A1 * | 6/2011 | Jungmann | F16D 65/18 |
| | | | 188/71.7 |
| 2017/0307035 A1 * | 10/2017 | Henning | F16D 65/567 |

FOREIGN PATENT DOCUMENTS

| | | |
|---|---|---|
| DE | 4034165 A1 | 12/1991 |
| DE | 9206052 U1 | 9/1993 |
| DE | 4307018 A1 | 9/1994 |
| DE | 19507308 A1 | 9/1996 |
| DE | 19814807 A1 | 10/1999 |
| DE | 10260597 A1 | 7/2004 |
| DE | 102005003223 A1 | 7/2006 |
| DE | 102008037775 B3 | 2/2010 |
| DE | 202006021050 U1 | 1/2012 |
| EP | 0338248 A1 | 10/1989 |
| EP | 0534989 B1 | 4/1993 |
| EP | 0545358 A1 | 6/1993 |
| EP | 1172578 B1 | 1/2002 |
| EP | 1852627 A2 | 11/2007 |
| EP | 2695780 A2 | 2/2014 |

* cited by examiner

DISC BRAKE WITH ADJUSTMENT MECHANISM HAVING A THREAD DEVICE

CROSS REFERENCE TO RELATED APPLICATIONS

This application is a U.S. National Stage Application under 35 U.S.C. § 371 of International Application No. PCT/EP2015/002233 filed on Nov. 6, 2015, and claims benefit to German Patent Application No. DE 10 2014 017 430.1 filed on Nov. 25, 2014. The International Application was published in German on Jun. 2, 2016 as WO 2016/082912 A1 under PCT Article 21(2).

FIELD

The invention relates to a disk brake having a brake disk, a brake caliper, at least one application device lying within the brake caliper on one side of the brake disk, an axially movable device, and an adjustment mechanism.

BACKGROUND

In general, wear adjustment devices are known in different embodiments, e.g. mechanical adjusters of the kind which nowadays ensure a constant release clearance within certain limits in current commercial vehicle disk brakes. Since the adjusters have to maintain a constant release clearance in all driving and braking situations, the requirements on the precision of such adjusters are very high. In particular, this determines the release clearance which must be crossed for pad contact, the pivoting travel of a pivoted lever used for brake application, for example, and thus the maximum braking force that can be applied or the braking force reserve.

In such disk brakes fitted with an adjustment device, the adjustment device is activated in the event of brake actuation and a release clearance that is different from a desired value, e.g. by a feed element of the application device of the disk brake. Thus, if wear occurs on the brake pads and/or the brake disk with a resulting change (increase) in the release clearance, automatic adjustment of the pads is performed by means of the adjustment device, e.g. by an adjusting movement of pressure rams. A release clearance predetermined by the design is reproduced in the form of fixed geometrical quantities in the component elements participating in the adjustment process.

Disk brakes which have an application device actuated by the pivoted lever are known from DE 195 07 308 A1 and DE 10 2008 037 775 B3. In these cases, the application device itself includes a pivoted lever with an eccentrically acting braking shaft, the rotation or sliding axis of which is parallel to the brake disk plane and which acts on a pressure piece that can be moved in the brake caliper. The terms "cross piece" or "bridge" have also been used hitherto instead of "pressure piece". For the sake of simplicity, therefore, only the phrase "movable element" will be used below. The movable element itself is arranged non-rotatably in the brake caliper. Mounted centrally in the movable element is a pressure spindle device, which has a rotatable adjustment nut provided with a pressure collar and a pressure spindle or actuating spindle screwed into said nut but held non-rotatably. Via these parts, the application force is transmitted to at least one brake pad, which is then pressed against the brake disk.

In the above mentioned disk brakes, the adjustment device is held in a fixed manner in that end region of the adjustment nut provided rotatably and with a pressure collar which is remote from the brake disk. Since the adjustment nut itself is likewise mounted in a fixed manner in the movable element, the adjustment device follows the axial movements of the movable element during application movements. The term "in a fixed manner" refers to the position of the adjustment device both when the brake is unactuated and when the brake is actuated and during the adjustment itself.

The parts belonging to the adjuster can be divided functionally into an input region and an output region, wherein the input region is coupled for conjoint rotation to the pivoted lever. The rotary movement is transmitted via a wrap spring acting as a one-way clutch to the output region, which brings about the rotation of the adjustment nut via a mechanical separating clutch/separating device, which is spring-loaded and thus acts in a load- or torque-dependent manner. The separating clutch/separating device is a friction cone, for example. Since the pressure or actuating spindle screwed into the rotatable adjustment nut is held fixed against relative rotation, it is screwed out in the direction of the brake disk. The adjusting step is ended when, owing to the force stroke, the friction in the adjustment nut mounting or threaded pair rises and exceeds the maximum possible adjustment torque. The torque-dependent clutch then slips, thereby preventing elastic brake deformations during the force stroke from affecting the adjustment travel.

In the brakes described above, those parts which belong to the adjuster are connected in series when viewed in an axial direction and are connected in a fixed manner to the movable element. This requires an appropriate installation length in the axial direction. Since the brake application parts, i.e. the adjustment nut and the pressure spindle, furthermore take up a corresponding installation space, it is not possible to increase the size of the parts in order to achieve higher application forces owing to the predetermined caliper shape. Moreover, the adjusting parts which form the spring-loaded mechanical separating device in all the adjustment devices are subject to relative wear in the contact regions, and this affects the accuracy of adjustment.

DE 40 34 165 A1 discloses a disk brake having a movable element referred to as a cross piece. The movable element is provided with a threaded bore, into which is screwed an actuating spindle connected operatively to an adjustment device (rotary drive) for setting the release clearance. In this brake, the totality of the adjustment device serving as a rotary drive is designed as a coherent subassembly of elongate or tubular design in the axial direction. This device is inserted into the interior of the caliper through a caliper opening facing away from the brake disk and is secured in a fixed manner there on the caliper end, with the result that it extends into an opening in the actuating spindle. The rotary drive therefore lies concentrically within the hollow rotary spindle. In this case, the rotary drive or the output part thereof is coupled in a non-rotatable but axially movable manner to the actuating spindle via axial profiles. In this way, the rotary movements of the adjuster are transmitted to the actuating spindle. With increasing wear adjustment, the actuating spindle is screwed out of the movable element in the direction of the brake pad or brake disk and is thus also moved axially relative to the fixed-location adjuster. Friction clutches or ratchet mechanisms, which are each spring-loaded and act mechanically, are used as the torque-dependent separating device within the adjuster subassembly.

Since the adjuster in the brake according to DE 40 34 165 A1 is secured in a fixed manner on the brake caliper and the movable element referred to as a cross piece is moved with the adjusting spindle in each actuation, opposed relative movements take place in the contact regions between the adjuster or the output part thereof and the adjusting spindle, and rotary movements are furthermore superimposed on these movements during an adjusting step. Since the application device, on the one hand, and the adjustment device, on the other, are separate subassemblies here, this requires a corresponding assembly effort. Moreover, the opposed relative movements can affect the accuracy of adjustment.

The brake according to German Utility Module 92 06 052 includes an application device having a pivoted lever and a pressure spindle device, which is not mounted in an additional movable element but is mounted directly in the brake caliper. The adjustment device, in turn, is held in a fixed manner on the brake caliper and rests as a separate subassembly on an axis parallel to the rotation axis of the pressure spindle device. The rotary movements are transmitted by the adjuster to the pressure spindle device via a gear mechanism.

A similar disk brake to that in German Utility Model 92 06 052 is shown in EP 1 852 627 A2. Admittedly, it is designed as a single-spindle brake. On the other hand, however, a parallel offset is provided between the adjuster and the pressure spindle device, with a gear mechanism situated in between.

Both the brake according to German Utility Model 92 06 052 and that according to EP 1 852 627 A2 are provided with mechanically acting separating devices (friction clutch), which are controlled by spring force and are intended to prevent excessive adjustment in the force stroke.

The disk brake according to DE 10 2005 003 223 A1 is a double-spindle brake of similar basic construction to the initially mentioned brakes according to DE 195 07 308 A1 and DE 10 2008 037 775 B3. Once again, a pressure spindle device having an adjustment nut and an actuating spindle is namely mounted in a movable element. The adjustment device is attached in a fixed manner to the movable element, on the one hand, and—as in DE 40 34 165 A1 too, for example—attached in a fixed manner to the brake caliper end, on the other hand. Since, here too, opposed relative movements take place—even within the adjustment device—the first and second regions of the adjuster are coupled by means of an axial connecting clutch (dog clutch). This adjustment device too has a mechanically acting separating device (slipping clutch) in order to avoid excessive adjustments.

DE 20 2006 021 050 U1 shows an adjustment device, which is held in a fixed manner on the brake caliper, mounted between two pressure rams and situated in the force flow of brake application, and a mechanical separating device acting load- or torque-dependently in the form of an axially acting ball clutch in order to avoid excessive adjustment.

DE 43 07 018 A1 shows a disk brake having an adjustment device which is held in a fixed manner on the brake caliper in all operating states and the output part of which extends longitudinally in the actuating spindle. It is connected operatively or coupled to the actuating spindle by means of a profiled disk in a manner which prevents relative rotation but allows axial movement. As a rotary drive for adjustment via a one-way clutch use is made of a torsion spring leg coupled directly to the pivoted lever, wherein the torsion spring acts as an overload safeguard and as an energy storage device in order to adjust the lining wear which takes place during the braking process, possibly also during the brake release stroke. Apart from the disadvantageous opposed relative movements during the application and adjustment process in the contact regions between the application device and the adjuster itself, the embodiment and mounting of the adjuster both with respect to the pivoted lever and the brake caliper and also mounting with respect to the adjusted parts relative to one another owing to frictional effects are fault-prone, in particular. Accuracy of adjustment could thus be impaired. Since, furthermore, the brake application and adjustment parts are arranged in series in the brake caliper—when viewed axially—the resulting overall caliper lengths do not meet the requirements in respect of the restricted installation conditions in the commercial vehicle. Moreover, the assembly effort does not meet all the requirements for automation.

SUMMARY

In an embodiment, the present invention provides a disk brake. The disk brake includes a brake disk, a brake caliper, at least one application device lying within the brake caliper on one side of the brake disk, an axially movable device configured to move a brake pad axially toward the brake disk by way of at least one actuating spindle when the brake is actuated, wherein the actuating spindle can be rotated, has an external thread, and is configured to be screwed into a threaded bore in the movable device, and an adjustment mechanism configured to be rotated about a rotation axis lying parallel to a rotation axis of the brake disk and which, in the case of rotation in a first direction of rotation bringing about adjustment, is configured to rotate the actuating spindle via a rotational coupling acting in the direction of rotation. The adjustment mechanism comprises a thread device which, at least in a rotation in a second direction of rotation opposite the first direction of rotation, is configured to mesh with the external thread of the actuating spindle and to screw the adjustment mechanism in relation to the actuating spindle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
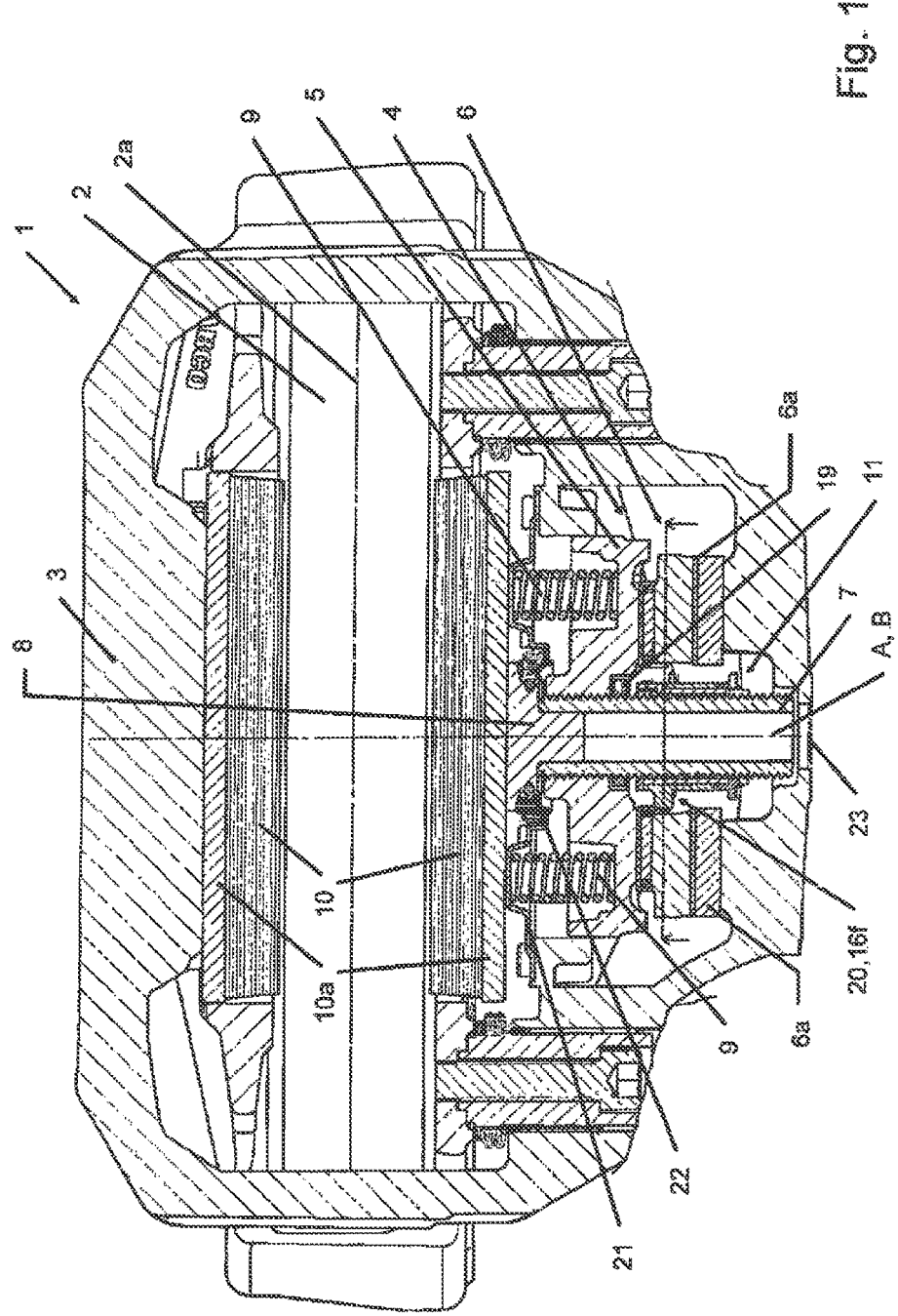
FIG. 1 shows a partially sectioned plan view of a disk brake according to an embodiment of the invention.

The invention relates to a disk brake, in particular for commercial vehicles, having a brake disk, a brake caliper, at least one application device lying within the brake caliper on one side of the brake disk, an axially movable device, and an adjustment mechanism. The axially movable device moves a brake pad axially toward the brake disk by means of at least one actuating spindle when the brake is actuated, wherein the actuating spindle can be rotated, has an external thread, and is screwed into a threaded bore in the movable device. The adjustment mechanism can be rotated about an axis lying parallel to the rotation axis of the brake disk and which, in the case of rotation in a first direction of rotation bringing about adjustment, rotates the actuating spindle because of a rotational coupling acting in said direction of rotation.

Embodiments of the invention build upon the disk brake known from DE 40 34 165 A1. Embodiments of the invention improve known brake in such a way that certain the disadvantages with respect to construction, mounting, accuracy of adjustment, and flexibility of use may be avoided.

According to an embodiment of the invention, a disk brake of the type stated at the outset by virtue of the fact that the adjustment mechanism has a thread device, which, at least in the case of rotation in a second direction of rotation opposite the first direction of rotation, meshes with the external thread of the actuating spindle and screws the adjustment mechanism in relation to the actuating spindle.

In other words, the adjustment mechanism is not held in a fixed manner on the brake caliper or in a fixed manner on the movable element. On the contrary, holding/mounting is directly on the threaded region of the actuating spindle. The operative connection is established directly via the external thread of the actuating spindle. Means of fastening/holding the adjustment mechanism on the movable element or on the brake caliper, which are required in the known disk brakes, can therefore be omitted. The actuating spindle itself carries the adjustment mechanism.

According to an embodiment of the invention, the adjustment mechanism is held directly on the actuating spindle. An adjustment nut can therefore be omitted. This considerably simplifies the brake.

As a preferred option according to an embodiment of the invention, the thread device is a wrap spring, which has the same pitch as the external thread of the actuating spindle. This wrap spring can therefore perform two functions simultaneously. On the one hand, it serves to enable the adjustment mechanism to be screwed with the actuating spindle, at least as regards the second direction of rotation. On the other hand, it forms a one-way clutch which ensures that the adjustment mechanism is rotationally coupled to the actuating spindle in the case of rotation in the first direction of rotation and therefore rotates the actuating spindle.

According to an embodiment of the invention, provision is furthermore preferably made for two or more turns of the wrap spring to mesh with the external thread of the actuating spindle. Reliable coupling is thereby ensured. In addition or alternatively, provision can be made according to the invention for the thread device to have a threaded disk which has at least one internal thread portion fitting with the external thread of the actuating spindle. Here, three or more segmented internal thread portions are preferably provided. In order to ensure the directional dependence of the coupling of the adjustment mechanism, a clamping roller free-running hub is preferably provided according to the invention.

Moreover, provision is furthermore preferably made according to an embodiment of the invention for the adjustment mechanism to have an overload clutch. This can be the wrap spring already mentioned above. Further embodiments according to the invention provide a tolerance sleeve of a ratchet clutch.

As a further preferred option according to an embodiment of the invention, it is envisaged that the adjustment mechanism can be moved axially by at least a distance which corresponds to the maximum adjustment distance per adjusting step. This embodiment ensures that the adjustment mechanism does not make stop contact anywhere in any conceivable operating state owing to axial movements.

As a further preferred option according to an embodiment of the invention, a braking device which counteracts rotation of the actuating spindle can be provided. A braking device of this kind is used, on the one hand, to hold the actuating spindle fast during the screwing movements of the adjustment mechanism in the second direction of rotation. On the other hand, the braking device is used to avoid unwanted adjustments due to vibration and shaking on poor road surfaces.

As a further preferred option according to an embodiment of the invention, the adjustment mechanism preferably has at least one groove, the width of which corresponds to a desired release clearance. In the case of disk brakes which are applied by means of a pivoted lever, the groove accommodates a driver pin, which is used to rotate the adjustment mechanism during braking. Here, the play of the driver pin in the groove determines the release clearance.

According to another preferred embodiment of the invention, the adjustment mechanism has an input region and an output region as well as a torque-dependent clutch situated between the two regions. Here, the torque-dependent clutch forms an overload safeguard. According to an embodiment of the invention, the torque-dependent clutch may have a torsion spring. However, it may also be the tolerance sleeve or the ratchet clutch already mentioned above. In the case of a torsion spring, as a preferred option according to the invention, it is preloaded. Finally, provision is preferably made according to an embodiment of the invention for the torsion spring to be designed to store energy in the braking overstroke and hence to adjust the actuating spindle in the release stroke for purposes of brake adjustment. This embodiment makes it possible to achieve the desired release clearance again more quickly in the case of relatively severe wear, simply because adjustment takes place not only during the braking stroke but additionally also during the release stroke.

As already explained above, the adjustment mechanism is, according to an embodiment of the invention, preferably divided into at least two functional regions, namely an input region and an output region. The two regions are preferably concentric with respect to one another and are coupled to one another in such a way that they support one another not only radially but also axially. Thus, the adjustment mechanism forms a preassembled compact subassembly. It is thereby possible to save installation space in comparison with conventional brakes, where the individual adjusting parts are situated axially in series within the caliper. Moreover, holders or fastening parts, such as brake caliper regions, are no longer necessary to connect or couple the individual parts circumferentially and axially to one another.

The operative connection between the actuating spindle and the adjustment mechanism is preferably implemented in the threaded region of the actuating spindle remote from the brake disk, which extends into the caliper interior from the movable element. The saving in installation space thus achieved can be used for more generous dimensioning of the individual parts and/or for additional functional parts.

In the functional position, the adjustment mechanism is preferably fixed in the axial direction on the threaded region of the actuating spindle by positive engagement via its output region in such a way that there is always a defined spacing position relative to the movable element, at least in the operating state in which no adjusting step is performed. A functional clearance between relevant mutually facing surfaces of the movable element, on the one hand, and of the adjustment mechanism, on the other hand, also makes it impossible for any (static) friction stemming from trapped stresses in the holder etc. and affecting the adjustment to occur. The operative connection of the adjustment mechanism to the actuating spindle for setting the desired release clearance is designed in such a way that, when there is an increase in the release clearance owing to pad wear, the required adjusting step can take place during and/or after a brake actuation.

For this purpose, in accordance with an embodiment of the invention, the adjustment mechanism is coupled to the thread region of the actuating spindle by means of a one-way clutch in such a way that the one-way clutch acts in a manner dependent on the direction of rotation in the locking direction—i.e. in the case of an adjusting step being required—and the actuating spindle is screwed out of the threaded bore of the movable element in the direction of the brake disk. By virtue of the one-way clutch in locking function here, the adjustment mechanism will thus also follow this axial travel as a result of the rotation and corresponding to the degree of adjustment. In other words, the actuating spindle and the adjustment mechanism perform synchronous movements during the adjusting step. As already mentioned above, the one-way clutch can be formed from a wrap spring or a clamping roller free-running hub.

In the case of the clamping roller free-running hub, the clamping bodies are seated circumferentially directly on the external thread of the actuating spindle, and the torque is transmitted in the adjustment direction by frictional or non-positive engagement in the radial and in the circumferential direction. To ensure that the adjustment mechanism with the clamping roller free-running hub is fixed in the axial direction on the external thread of the actuating spindle and does not move in an unintended manner, there is provided at the end side a flat sheet which engages circumferentially in the thread course by means of segmented thread portions. In the case of the wrap spring serving as one-way clutch, wraps are coupled with the thread region of the actuating spindle while lying positively in the thread profile, with the result that the wrap spring acts in the locking direction dependent on the direction of rotation.

As already mentioned above, both versions of the one-way clutch with the adjustment mechanism perform synchronous rotations and axial movements with the actuating spindle during a required adjusting step.

To ensure that the adjustment mechanism screwed onto the actuating spindle via the one-way clutch provided respectively does not strike against the movable element and is thus blocked during this screwing-out movement, the functional clearance already mentioned above in the form of the distance between the mutually contacting surfaces of the adjustment mechanism, on the one hand, and of the movable element, on the other hand, is preferably greater than the maximum possible adjusting step or travel. Thus, there is "floating" support for the adjustment mechanism by means of the actuating spindle via the positive engagement and in the locking direction of the one-way clutch. In the above sense, "floating" means that the adjustment mechanism synchronously follows the adjustment spindle, at least over the travel of the respective adjusting step. During this process, the abovementioned functional clearance is reduced (temporarily).

Once the adjusting step is complete and the braking process is ended, the brake application and adjusting parts move back into their initial position by virtue of the restoring force of at least one compression spring. During this process, the adjustment mechanism is screwed back into its initial position and to the abovementioned functional clearance in the direction of free movement of the one-way clutch. To ensure that the actuating spindle is not screwed back during this process, a brake ring is preferably provided according to the invention, said brake ring being held on the movable element, for example, and acting with a constant frictional torque on the actuating spindle. The frictional or holding torque acting as a result on the external thread or axially on the thread flanks of the actuating spindle is preferably greater than the release or free-running torque of the opening one-way clutch. Since said frictional torque acts continuously, no unwanted rotary movements of the actuating spindle with unwanted changes in the release clearance can occur, even in the case of brake vibrations, for example.

While the adjustment mechanism remains in a fixed and constant/self-supporting position relative to the movable element over the entire wear-compensating adjustment travel (brake pad/brake disk), the actuating spindle is screwed out to an increasing extent in the direction of the brake disk until the pad wear limit is reached.

According to an embodiment of the invention, a sleeve-shaped part, referred to below as a grooved ring, is furthermore preferably used as an input region of the adjustment mechanism. The grooved ring can be coupled to the one-way clutch via a variety of overload clutches.

When using a clamping roller free-running hub, the grooved ring is non-positively or frictionally coupled via its inside diameter to the outer ring of the clamping roller free-running hub, for example by means of a tolerance sleeve, a tolerance ring or a friction ring, in order to serve, on the one hand, for torque transmission and, on the other hand, for overload safeguarding.

Within the context of the invention, the tolerance sleeve serving as overload clutch can also be replaced by a ratchet clutch because it is also possible in principle therewith to limit torque in order to avoid excessive degrees of adjustment.

When using a wrap spring, the grooved ring can be coupled with preloading via an elastic part to the region receiving the wrap spring. The elastic part can be a torsion spring. By virtue of the restoring force of the torsion spring, stops are braced against one another, the grooved ring also being held in a relatively rotatable manner with respect to the region with the wrap spring against the spring force.

According to another preferred embodiment of the invention, the grooved ring has at least one axial groove region, which preferably protrudes radially and into which at least one pivoted lever used to apply the brake or a driver, preferably a driver pin, connected to a braking shaft of this type, engages so as to activate the adjustment mechanism. The design desired release clearance is defined in the stop play between the walls of the at least one driver pin and the at least one axial groove. However, to make engagement more reliable, the desired release clearance can also be defined by groove segments similar to gearwheels and by a plurality of spaced driver pins. Moreover, it is also possible to kinematically reverse the engagement to the extent that geometrical conditions allow. The pivoted lever or the braking shaft would then be provided with one or more grooves, and the grooved ring would carry one or more driver pins.

It is expressly pointed out that both the principles of the one-way and the torque/overload clutches as explained above can also be combined with one another in other configurations.

The disk brake illustrated in the drawings and denoted by the reference sign 1 is a pneumatically or electromechanically actuated disk brake, the brake caliper 3 of which fits around a brake disk 2. Brake pads 10, each having a brake pad carrier 10a, are provided on both sides of the brake disk 2. An application device is denoted in a general way by the reference numeral 4. In this case, it is arranged on one side in the brake caliper 3, which can be a sliding caliper or a fixed caliper. The application device 4 includes a pivoted lever 6, which is connected to an application or braking shaft 6a arranged in the brake caliper 3 parallel to the principal plane 2a of the brake disk 2. A movable element 5, which likewise extends transversely to the brake disk plane 2a and is guided in the brake caliper 3, is furthermore provided. The pivoted lever 6 forms the connection between an actuating device (not shown), which introduces a force, and the braking shaft 6a. The brake axis is parallel to the principal axis (not shown) of the brake disk 2 and is denoted by the reference index A-B.

If the pivoted lever 6 is pivoted in direction D, in a manner which will not be explained in greater detail here, by an actuating device, which is secured on the end of the brake caliper, by means of a push rod that passes through a functional opening, for example, it exerts pressure via the transverse braking shaft 6a on the movable element 5, which, in the illustrative embodiment shown, is formed by a flexurally stiff cross piece of the brake and is mounted in the brake caliper 3 in a manner which prevents rotation but allows axial movement. The application device 4 is braced in such a way by at least one compression spring 9 arranged in the brake caliper 3 that all the functional parts rest against one another and the pivoted lever 6 is in its rest position, thus eliminating slippage.

The movable element 5 has at least one threaded bore, into which at least one actuating spindle 7 is screwed by means of an external thread 7a. The illustrative embodiment shown in the drawing is a single-spindle brake. The (single) actuating spindle 7 is screwed centrally into the movable element 5. Thus, the application force is transmitted to the application-side brake pad 10 either directly via the actuating spindle 7 or, as in the illustrative embodiment shown, via a pressure piece 8 inserted into the actuating spindle 7. When the pivoted lever 6 is actuated, the brake pad 10 is therefore displaced and, after crossing the (desired) release clearance L, is pressed against the brake disk 2.

On the brake-disk side, the brake caliper 3, which accommodates within it all the functional parts, is closed by a closure cap 21, wherein the through opening in the closure cap for the actuating spindle 7 is sealed off by at least one boot 22. On this side, therefore, the interior of the brake caliper is closed off and protected from environmental influences, for example.

Figure 2:
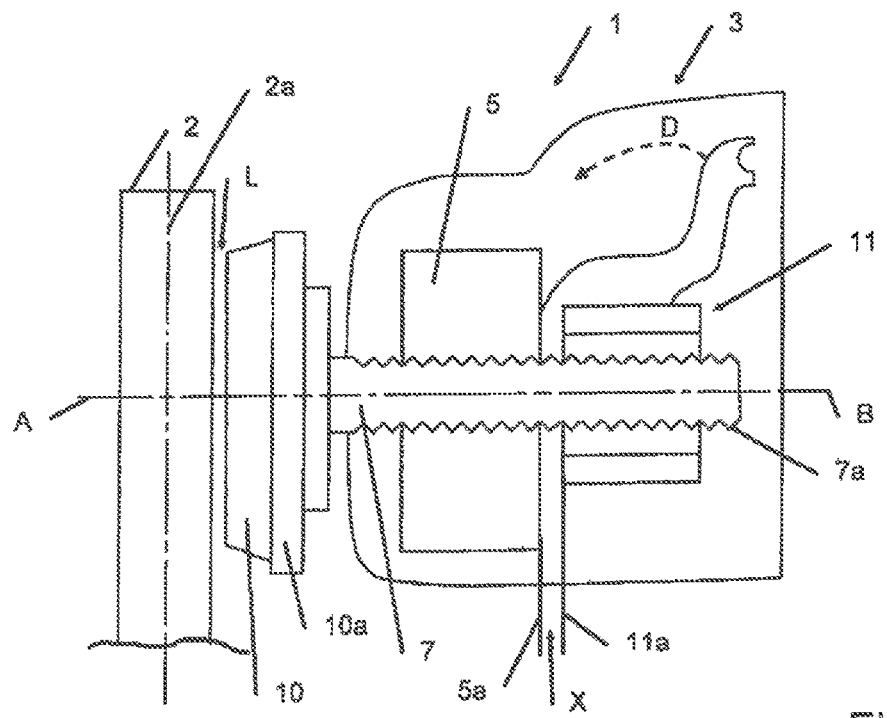
FIG. 2 shows a schematic side view of the disk brake of FIG. 1.

The fully preassembled subassembly of the adjustment mechanism is denoted in a general way by the reference numeral 11. In FIGS. 1 and 2, it is shown in the initial position with new brake pads 10. Here, the adjustment mechanism 11, which is screwed directly onto the actuating spindle 7, is in the position behind the movable element 5. A functional clearance X in the form of a spacing is present between an end face 11a of the adjustment mechanism 11 and an end face 5a of the movable element 5. The functional clearance X is larger than the maximum possible adjusting step or travel of the unscrewing spindle 7 during the adjustment process. It should be noted that the dimensions L, X shown in the figures serve only for illustration and, in actual fact, are dependent in terms of magnitude on the respective type of brake.

Coupling or activation of the adjustment mechanism 11 is accomplished by means of a driver pin 20, which is held on the braking shaft 6 and engages in an axial groove 16f of the adjustment mechanism 11. In the illustrative embodiment shown, a brake ring 19 is illustrated schematically, said ring exerting a constant frictional or retaining torque on the actuating spindle 7 and thus preventing unwanted rotary movements of the actuating spindle 7. The brake ring 19 is preferably held on the movable element 5.

Figure 3:
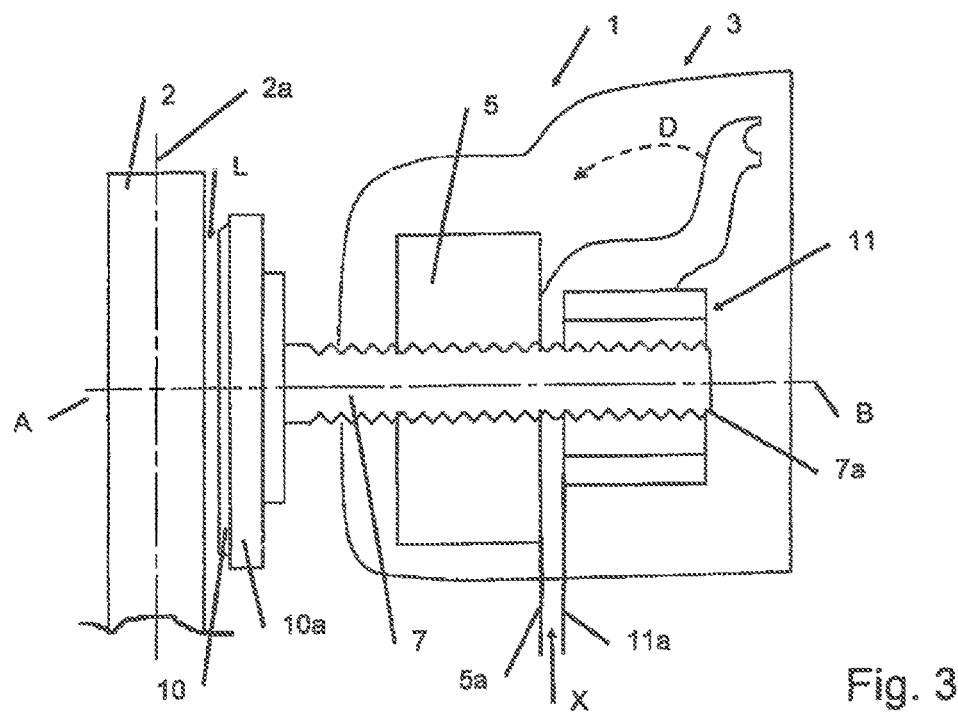
FIG. 3 shows the same view as FIG. 2 but with worn brake pads and unscrewed actuating spindle.

While FIGS. 1 and 2 show the new state of the brake pads 10 and of the brake disk 2 with a corresponding position of the parts in the interior of the brake, FIG. 3 shows schematically the state when the brake pads 10 are worn with a correspondingly changed position of the parts. Comparison of FIG. 3 with FIGS. 1 and 2 makes clear how the actuating spindle 7 has been screwed out of the movable element 5 and relative to the adjustment mechanism 11 owing to the adjusting steps or movements in the direction of the brake disk 2, while all the other positions of the parts have been maintained. There is also a decisive advantage of the adjustment mechanism shown here as regards reliability of braking. If, for example, the maximum possible pad wear is exceeded for whatever reason while driving, and the brake continues to be operated with excessive wear, the actuating spindle 7 is prevented from being screwed too far out of the movable element 5 owing to the reduction in the engagement of the wrap spring 14. In other words, it is no longer possible for adjusting torques and hence also adjusting movements to be transmitted. As a result, the thread contact, via which the flow of force stemming from the pivoted lever passes, within the scope of the pad wear, during the braking process, is maintained even in extreme states. In the case of conventional adjusters, this screwing out—with immediate loss of braking—cannot be reliably prevented.

If the brake pads 10 are replaced in this state, the actuating spindle 7 must be screwed back again in order to establish the required distance from the brake disk 2 for the new pads. In the illustrative embodiment shown here, a functional opening 23 is provided for this purpose on the rear side of the brake, via which opening the actuating spindle 7 can be screwed back into its initial position using suitable means and in a manner that will not be explained in detail here. After the pads have been changed, the position of the parts is then once again as shown in FIGS. 1 and 2. The functional opening 23 should be closed sealingly by suitable means.

Figure 4:
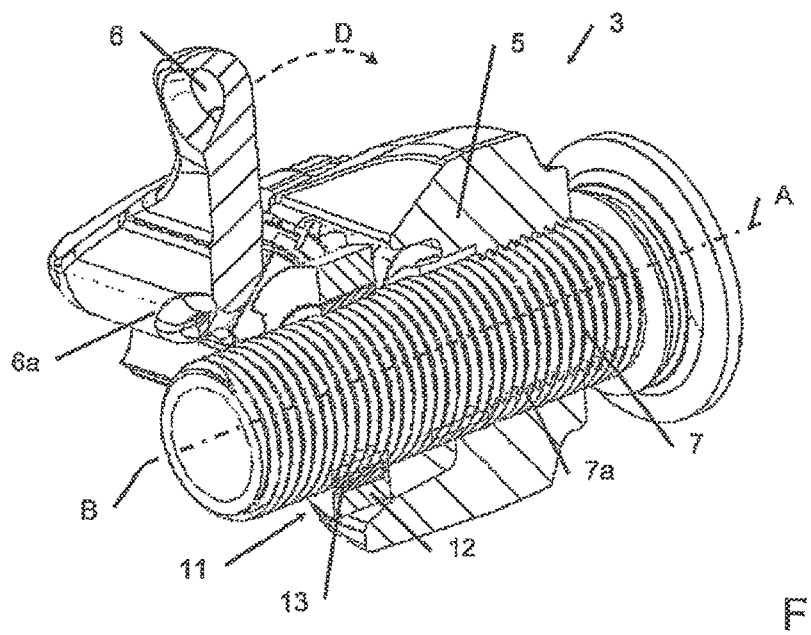
FIG. 4 shows a partially sectioned perspective view of a subassembly with an application device, an adjustment mechanism, and an actuating spindle according to an embodiment of the invention.

FIG. 4 shows schematically how the adjustment mechanism 11—with the input region 12 and the output region 13—is mounted on or in the external thread 7a of the actuating spindle 7.

Figure 5:
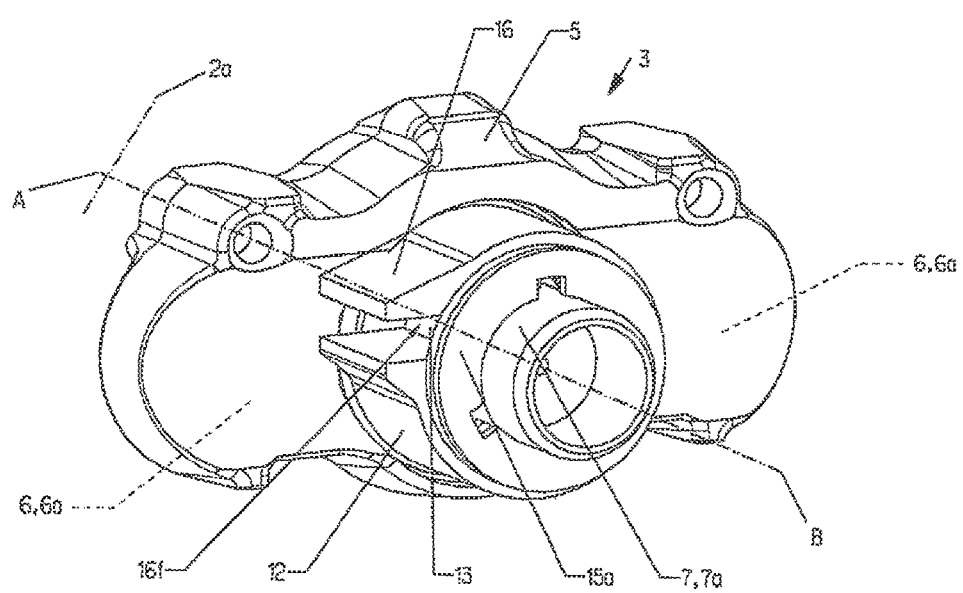
FIG. 5 shows a further perspective view of a subassembly with an adjustment mechanism according to an embodiment of the invention.
Figure 6:
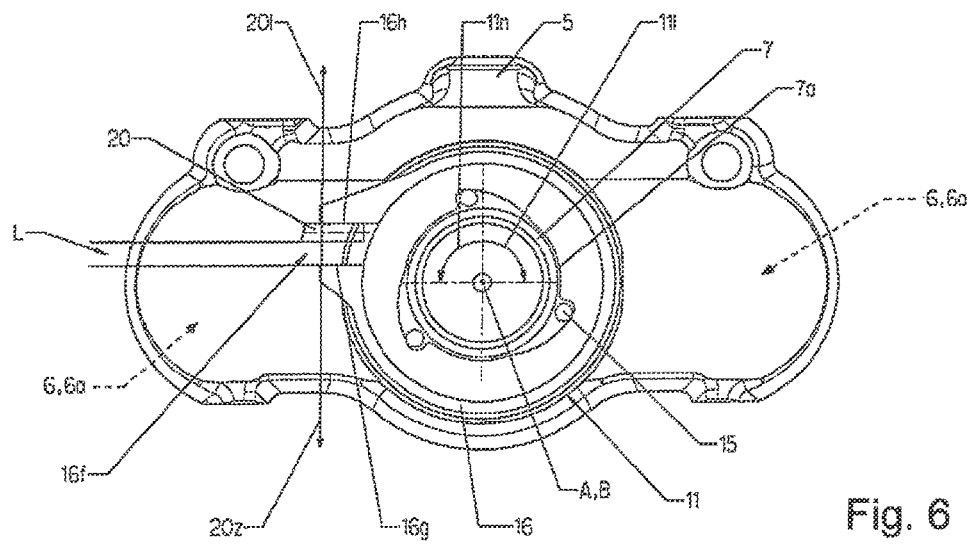
FIG. 6 shows a schematic axial view of a subassembly with an application device and an adjustment mechanism screwed on according to an embodiment of the invention.
Figure 7:
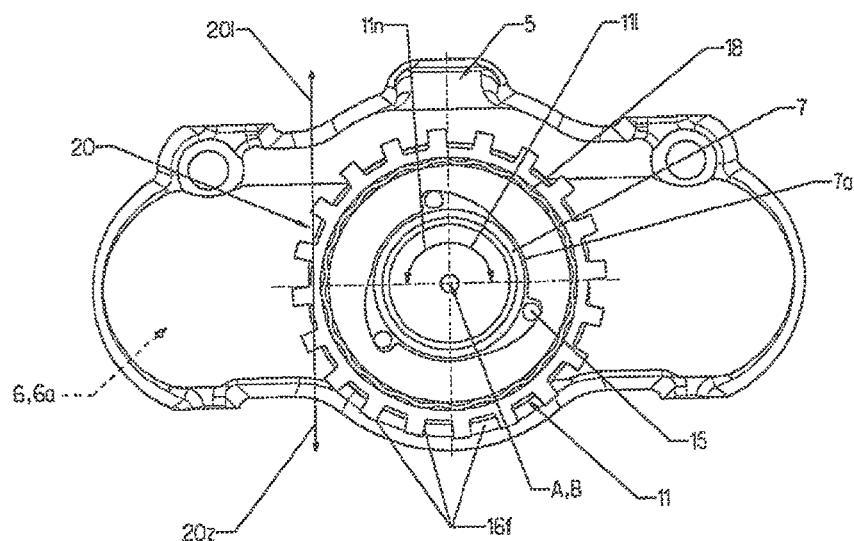
FIG. 7 shows the same view as FIG. 6 but according to another embodiment of the invention.

FIG. 5 shows in perspective the movable element 5 with mounted actuating spindle 7 and the adjustment mechanism 11 mounted on the external thread 7a of the actuating spindle 7, which adjustment mechanism, in the embodiment shown here and according to FIGS. 6 and 7, is screwed by means of a threaded disk 15a and mounted on the actuating spindle 7 in an axially secured manner.

FIGS. 6 and 7, like FIG. 5, show the parts and functional positions thereof relative to one another. A tolerance sleeve 18, which acts as an overload clutch, is installed, for non-positive/frictional torque transmission, between the grooved ring 16 and the clamping roller free-running hub 15 acting on the external thread 7a of the actuating spindle 7. The tolerance sleeve 18 can also be referred to as a tolerance ring or friction ring. The advantage of this type of torque limitation lies in the simple construction and in the more reliable function by comparison with mechanical separating clutches as are known from conventional brakes, for example with spring-loaded tooth-type or ball-type locking mechanisms.

The grooved ring 16 has a region with an axial groove 16f into which there engages a driver pin 20 connected to the pivoted lever 6 or the braking shaft 6a. The walls of the driver pin 20 and of the axial groove 16f are spaced apart from one another in such a way that the free space in a direction 20z constructionally predetermines the release clearance L or the idle stroke if the pivoted lever 6 is pivoted in direction D according to FIGS. 2 to 4. FIG. 7 shows the possibility of a multiple engagement of one or more adjustment pins 20 in which the grooved ring 16 has formed thereon circumferential groove segments 16f or, as shown, in toothed wheel form. Here, too, the adjustment function is performed as with a single axial groove.

Figure 8:
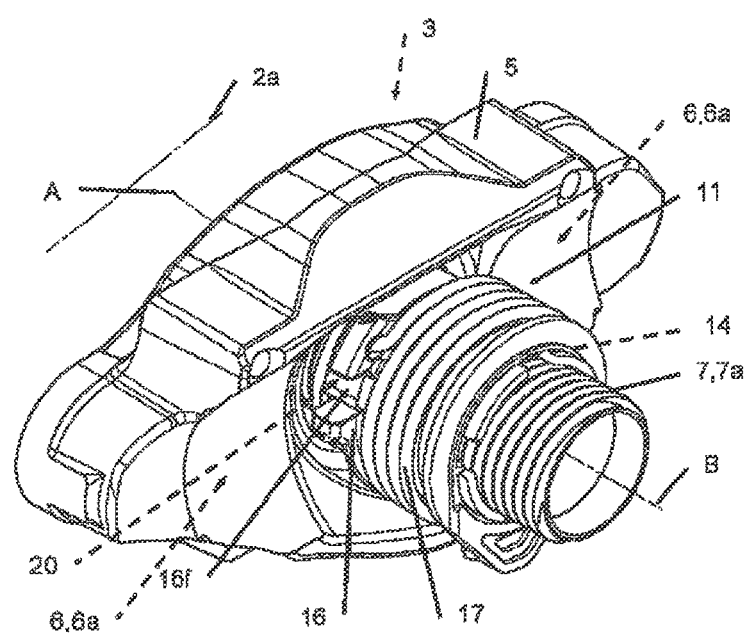
FIG. 8 shows the same view as FIG. 5 but according to another embodiment of the invention.

In the embodiment according to FIG. 8, the adjustment mechanism 11 is screwed positively with the wrap spring 14 onto the actuating spindle 7 with the external thread 7a. In this embodiment, the wrap spring 14 acting as one-way clutch in the locking direction acts for rotary drive. The region with the wrap spring 14 is coupled to the grooved ring 16 by means of a spring-elastic part—which is here a torsion spring 17—, with the result that the torsion spring 17 transmits adjustment torques up to a limit torque. Overload torques are converted into a corresponding deformation of the torsion spring which stores them in the manner of an energy store. This energy is released again when the system is relieved. There results an additional adjusting step which is transmitted to the actuating spindle 7 via the wrap spring 17. Consequently, particularly with excess pad wear caused for example by downhill travel, the rate of adjustment is increased because adjustment can take place in both directions of movement. Moreover, the driver pin 20 engages here, too, in the axial groove 16f to activate the adjustment mechanism 11, which means that, here, too, all the statements made above likewise apply to the individual embodiments.

In the embodiments of the invention which have been represented, the installation positions/spacings between the movable element 5, the actuating spindle 7 screwed therein and the adjustment mechanism 11 screwed onto the actuating spindle 7 are dimensioned relative to one another in such a way that both the alignment of the axial groove 16f and the functional clearance X required for the unhindered adjusting process for complete assembly with further parts of the application device 4 can be preset. The installation and functional positions are shown by FIGS. 1 and 2. These are explained above.

The adjustment function is explained below with reference to an exemplary embodiment, in particular with reference to FIGS. 2, 6 and 7.

If the brake according to FIG. 2 is actuated by means of an actuating device (not shown in the drawing) attached to the brake caliper 3, the pivoted lever 6 is pivoted in direction D, wherein the brake application parts on the input side are moved with the brake pad 10 along the axis A-B in the direction of the brake disk 2 against the spring force of the compression springs 9 by means of the braking shaft 6a. During this process, the idle stroke is traversed, corresponding to the desired release clearance L. Here, the desired release clearance L is predetermined by the design in FIG. 6 as the stop play between the walls of the axial groove 16 and the driver pin 20. Initially, the driver pin 20 rests against the upper groove wall 16h. If the idle or application stroke is within the desired release clearance L, only an application movement but no adjusting movement takes place.

If there is a change in the release clearance, with a deviation from the desired release clearance L, and the pivoted lever 6 is pivoted further, the driver pin 20 presses against the lower groove wall 16g in direction 20z, and the grooved ring 16 is rotated. By virtue of the frictional connection with the tolerance sleeve 18, the grooved ring 16 rotates the clamping roller free-running hub 15 acting in the locking direction, said hub 15 in turn then rotating the actuating spindle 7, and thereby reducing the release clearance. During this process, the adjustment mechanism 11 follows the movement of the actuating spindle synchronously in the adjustment direction 11n, reducing the functional clearance X.

If the pivoted lever 6, including the braking shaft 6a, is moved back by the compression spring 9 after the braking process, the driver pin 20 moves in the release direction 20l and, in striking against the upper groove wall 16h, rotates the grooved ring 16 back into the initial position. Since the frictional torque M1 exerted on the actuating spindle 7 by the brake ring 19 is higher than the free-running torque M3 of the clamping roller free-running hub 15 serving as a one-way clutch, the clamping roller free-running hub 15, together with the adjustment mechanism 11, is rotated back in the release direction 11l via the intervention of the threaded disk 15a on the actuating spindle 7, which does not rotate during this process, until it reaches its initial position again with the functional clearance X. Thus, the desired release clearance L is re-established.

If the brake movements which take place go beyond the normal braking stroke with corresponding elastic deformations of the brake caliper 3, for example, or if increased pad wear occurs during downhill stretches due to prolonged braking operations, the torque on the clamping roller free-running hub 15 rises sharply owing to the overstroke, and the rotary movement is stopped by the tolerance sleeve 18 which serves as overload protection. In other words, with further rotary movement of the grooved ring 16, driven by the driver pin 20 in the application direction 20z, the frictional engagement or the rotary coupling of the tolerance sleeve 18 is cancelled, with the result that, owing to slippage, it is also no longer possible for there to occur a further adjusting step with an excess adjustment movement or an excess unscrewing of the actuating spindle 7 from the element 5.

It is thus possible, by means of the above-described embodiments of the subassembly of the adjustment mechanism 11, to control required adjusting movements in an effective manner by simple means and without the mechanical separating clutches known from conventional brakes.

In this case, it is also possible to reduce the number of adjusting steps for setting the desired release clearance in comparison with known brakes because the adjusting process can take place in both directions of movement of the pivoted lever, depending on the circumstances or progress of the braking process. Thus, the desired release clearance can be set more quickly than in conventional solutions, which perform adjustment only during movement in one direction. The brake stroke or braking efficiency can thereby also be improved indirectly.

In this context, reference is expressly made with respect to the special advantages of the use of the torsion spring 17 to the statements in a German patent application filed at the same time.

If manual adjustments are required as part of service work on the brake itself or while changing the brake pads, for example, this is accomplished by rotating the actuating spindle 7 in the application or release direction by suitable means via the functional opening 23 already mentioned above on the rear side of the brake caliper 3.

Although the invention has been explained with reference to a single-spindle brake, the adjustment mechanism according to the invention can also be used in a two- or multi-spindle brake. In the case of a two-spindle brake, for example, each actuating spindle can be equipped with a dedicated adjustment mechanism. As an alternative, the adjusting movement can be transmitted in synchronism to the other actuating spindle by just a single adjustment mechanism by means of an appropriate synchronizing device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 disk brake
2 brake disk
2a brake disk plane
3 brake caliper
4 application device
5 movable element (pressure piece/cross piece/bridge)
5a end face, axial (in direction 11a)
6 pivoted lever
6a eccentric braking shaft
7 actuating spindle
7a external thread of the actuating spindle 7
8 pressure piece
9 return spring in the form of a compression spring
10 brake pad
10a brake pad carrier
11 adjustment mechanism
11a end face, axial (in direction 5a)
11n adjusting direction (of 11)
11l release direction (of 11)
12 input region
13 output region
14 wrap spring (one-way clutch)
15 clamping roller free-running hub
15a flat sheet with internal thread profile (threaded disk)
16 grooved ring
16f axial groove (for 20)
16g groove wall
16h groove wall
17 torsion spring
18 tolerance sleeve/tolerance ring/friction ring
19 brake ring
20 driver pin (on 6a)
20z application direction (of 20)
20l release direction (of 20)
21 closure cap (on 3)
22 boot
23 functional opening (on 3)
L idle travel/release clearance
X functional clearance (between 5a and 11a)
D pivoting direction, pivoted lever
A-B application and rotation axis of the actuating spindle
M1 constant frictional torque of the brake ring
M3 free-running torque, one-way clutch

The invention claimed is:

1. A disk brake, comprising:
a brake disk,
a brake caliper,
at least one application device lying within the brake caliper on one side of the brake disk,
an axially movable device configured to move a brake pad axially toward the brake disk by way of at least one actuating spindle when the brake is actuated, wherein the actuating spindle can be rotated, has an external thread, and is configured to be screwed into a threaded bore in the movable device, and
an adjustment mechanism configured to be rotated about a rotation axis lying parallel to a rotation axis of the brake disk and which, in the case of rotation in a first direction of rotation bringing about adjustment, is configured to rotate the actuating spindle because of a rotational coupling acting in the direction of rotation, wherein the adjustment mechanism comprises a thread device which, at least in a rotation in a second direction of rotation opposite the first direction of rotation, is configured to mesh with the external thread of the actuating spindle and to screw the adjustment mechanism in relation to the actuating spindle.

2. The disk brake as claimed in claim 1, wherein the thread device is a wrap spring having a same pitch as the external thread of the actuating spindle.

3. The disk brake as claimed in claim 2, wherein two or more turns of the wrap spring are configured to mesh with the external thread of the actuating spindle.

4. The disk brake as claimed in claim 1, wherein the thread device has a threaded disk which has at least one internal thread portion fitting with the external thread of the actuating spindle.

5. The disk brake as claimed in claim 4, wherein the adjustment mechanism has a clamping roller free-running hub.

6. The disk brake as claimed in claim 4, wherein the adjustment mechanism has an overload clutch.

7. The disk brake as claimed in claim 6, wherein the overload clutch has a tolerance sleeve.

8. The disk brake as claimed in claim 6, wherein the overload clutch is a ratchet clutch.

9. The disk brake as claimed in claim 1, further comprising at least one groove on the adjustment mechanism, wherein a width of the adjustment groove corresponds to a desired release clearance.

10. The disk brake as claimed in claim 9, wherein the torsion spring is preloaded.

11. The disk brake as claimed in claim 9, wherein the torsion spring is configured to store energy in a braking overstroke and hence to adjust the actuating spindle in a release stroke for purposes of brake adjustment.

12. The disk brake as claimed in claim 1, further comprising a braking device which counteracts rotation of the actuating spindle.

13. The disk brake as claimed in claim 12, wherein the torque-dependent clutch has a torsion spring.

14. The disk brake as claimed in claim 1, wherein the adjustment mechanism is configured to be moved axially by at least a distance which corresponds to the maximum adjustment distance per adjusting step.

15. The disk brake as claimed in claim 1, wherein the adjustment mechanism has an input region, an output region, and a torque-dependent clutch situated between the two regions.

\* \* \* \* \*